United States Patent
Pham

(10) Patent No.: US 10,140,521 B2
(45) Date of Patent: Nov. 27, 2018

(54) METHOD, SYSTEM AND APPARATUS FOR PROCESSING AN IMAGE

(71) Applicant: CANON KABUSHIKI KAISHA, Tokyo (JP)

(72) Inventor: Quang Tuan Pham, North Ryde (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/279,205

(22) Filed: Sep. 28, 2016

(65) Prior Publication Data

US 2017/0091561 A1  Mar. 30, 2017

(30) Foreign Application Priority Data

Sep. 30, 2015 (AU) .............................. 2015234329

(51) Int. Cl.
| | | |
|---|---|---|
| G06K 9/00 | (2006.01) | |
| G06K 9/34 | (2006.01) | |
| G06K 9/62 | (2006.01) | |

(52) U.S. Cl.
CPC ..... *G06K 9/00771* (2013.01); *G06K 9/00288* (2013.01); *G06K 9/00369* (2013.01); *G06K 9/34* (2013.01); *G06K 9/6218* (2013.01)

(58) Field of Classification Search
None
See application file for complete search history.

(56) References Cited

U.S. PATENT DOCUMENTS

| | | | |
|---|---|---|---|
| 8,457,368 B2 | 6/2013 | Kovtun et al. | |
| 9,355,334 B1 * | 5/2016 | Martinson | G06K 9/00369 |
| 2006/0257048 A1 | 11/2006 | Lin et al. | |

(Continued)

FOREIGN PATENT DOCUMENTS

AU   2013273657 A1   7/2015

OTHER PUBLICATIONS

M. Farenzena, et al., "Person re-identification by symmetry-driven accumulation of local features", Computer Vision and Pattern Recognition, IEEE Computer Society Conference on Computer Vision and Pattern Recognition, Jun. 2010, pp. 2360-2367.

(Continued)

*Primary Examiner* — Qian Yang
(74) *Attorney, Agent, or Firm* — Canon USA, Inc. I.P. Division

(57) ABSTRACT

Method, system, apparatus and computer readable medium for re-identifying a query objection moving from a first camera view to a second camera view. The method comprises the steps of accessing a first set of image frames (Q) captured from the first camera view and a second set of image frames (C) captured from the second camera view; selecting a first representative frame (QR) from the first set of image frames and a second representative frame (CR) from the second set of image frames based on a plurality of intra-camera object appearance distances between frame pairs in each set of image frames; and re-identifying the candidate object in the second camera view as the query object in the first camera view based on at least one inter-camera object appearance distance (D) calculated between the first representative frame and the second representative frame.

22 Claims, 12 Drawing Sheets

(56) References Cited

U.S. PATENT DOCUMENTS

2012/0075450 A1* 3/2012 Ding ................. G06K 9/00335
348/77
2016/0356882 A1* 12/2016 Glas ........................ G01S 17/42
2017/0091413 A1* 3/2017 Kondo ................. G06F 19/321
2017/0200051 A1* 7/2017 Brown ............... G06K 9/00771

OTHER PUBLICATIONS

Taiqing Wang, et al., "Person Re-identification by Video Ranking", Computer Vision—ECCV 2014, vol. 8692 of the series Lecture Notes in Computer Science, Sep. 2014, pp. 688-703.
Slawomir Bak, et al., "Improving person re-identification by viewpoint cues", In 11th IEEE International Conference on Advanced Video and Signal Based Surveillance, AVSS 2014, Seoul, South Korea, Aug. 26-29, 2014, pp. 175-180.

* cited by examiner

Fig. 9A

| | Frame index | | | | | | | |
|---|---|---|---|---|---|---|---|---|
| | | 0 | 1 | 2 | 3 | 4 | 5 | 6 | 7 |
| Frame index | 0 | 0 | 10 | 7 | 7 | 9 | 29 | 105 | 12 |
| | 1 | 10 | 0 | 10 | 8 | 10 | 65 | 65 | 9 |
| | 2 | 7 | 10 | 0 | 9 | 11 | 83 | 100 | 10 |
| | 3 | 7 | 8 | 9 | 0 | 7 | 55 | 120 | 5 |
| | 4 | 9 | 10 | 11 | 7 | 0 | 92 | 111 | 7 |
| | 5 | 29 | 65 | 83 | 55 | 92 | 0 | 3 | 68 |
| | 6 | 105 | 65 | 100 | 120 | 111 | 3 | 0 | 69 |
| | 7 | 12 | 9 | 10 | 5 | 7 | 68 | 69 | 0 |

Fig. 9B

| 22.4 | 22.1 | 28.8 | 26.4 | 31.9 | 49.4 | 71.6 | 22.5 |
|---|---|---|---|---|---|---|---|

Fig. 9C

| 7.5 | 7.8 | 7.8 | *6* | 7.3 | - | - | 7.2 |
|---|---|---|---|---|---|---|---|

METHOD, SYSTEM AND APPARATUS FOR PROCESSING AN IMAGE

REFERENCE TO RELATED PATENT APPLICATION(S)

This application claims the benefit under 35 U.S.C. § 119 of the filing date of Australian Patent Application No. 2015234329, filed Sep. 30, 2015, hereby incorporated by reference in its entirety as if fully set forth herein.

TECHNICAL FIELD

Aspects of the present disclosure relate generally to image and video processing and, in particular, to re-identifying an object between two camera views.

BACKGROUND

Public venues such as shopping centres, parking lots and train stations are increasingly subjected to surveillance with large-scale networks of video cameras for applications such as security, safety, traffic management, and business analytics. In these applications, the surveillance system often captures close-up images of objects, such as humans, animals, or inanimate objects, in the area or persistently tracks movement of a suspicious object. In order to persistently track an object, a camera in the surveillance system follows the movement of the object on site. When the object is about to move out of the physical viewing limit of the camera, a second camera in the same network is assigned responsibility to track the object. The change in responsibility from the first camera to the second camera is often referred to as a "handoff" process. The handoff process typically happens between cameras with overlapping field of views. If the field of views of the cameras do not overlap, either spatially or temporally, a similar process called "object re-identification" may be performed. A key task in handoff or re-identification is to perform rapid and robust object matching from images of the objects captured by the two cameras.

Object matching from different camera viewpoints is difficult because different cameras often operate on different lighting conditions. Moreover, different objects may have similar visual appearance, or the same object (e.g., a person or a subject) can have different pose and posture across viewpoints.

One image processing method performs appearance-based object matching, which involves determining visual features of a query object from a first view, determining the same type of visual features of a candidate object from a second view, and then comparing the difference between the visual features. If the difference is smaller than a threshold, the query object and the candidate object are said to match. Otherwise, the query object and the candidate object do not match.

The visual features of an object can be computed from a single frame (i.e. image) or they can be computed from multiple frames. In single-shot object re-identification, a single image of the candidate object is matched to a single image of the query object. In multiple versus single-shot object re-identification, multiple images of the candidate object are available to be matched against a single image of the query object. The multiple images of an object are often captured by tracking the object across multiple video frames. Similarly, single-versus-multiple object re-identification involves matching a single candidate image with multiple images of the query object. Finally, multiple-to-multiple object re-identification involves having multiple images of the candidate and the query objects.

Having multiple images of an object of interest can be advantageous over having only one view of the object, especially if the object appears differently while moving. For example, a pedestrian may look different at different time instances during a walking cycle. Another example where multiple images is advantageous is when an object changes orientation during motion. In this case, the front and side views of the object may appear differently. However, comparing multiple views of the candidate object to multiple views of the query object can also lead to more computation. Moreover, in the presence of outlier frames, such as temporary occlusion, multiple-vs-multiple object re-identification can lead to more confusion.

To reduce object matching computation, one method combines the visual features computed from multiple frames to a single set of visual features. One way to combine features from multiple frames is to accumulate them, whereby each feature is averaged to a frequently appeared value across multiple frames. The averaging operation also has a de-noising effect. However, the accumulated features can also be corrupted by a small number of outlier instances, whose feature values are far beyond the normal expected range. For an object with a consistent appearance across multiple frames, the de-noising effect has a diminishing return after a small number of frames (e.g. 4 or 5 frames) are averaged.

Another known method uses a subset of frames instead of a whole image sequence of tracked objects. Landmark frames are detected using motion activity around the object of interest. Short video fragments around landmark frames are then used for object re-identification. Assuming the object of interest is a pedestrian and each image in the sequence is cropped to a tight bounding box around the tracked person, motion activities in the bottom half of each image correlate well with the person's walking cycle. A trough in the motion activity around the leg area corresponds to the time instance when the legs are furthest apart. A peak in the motion activity of the leg area corresponds to the time instance when the legs are momentarily co-joined. Matching objects around landmark frames ensure they are at the same pose, which increases the chance of a correct matching score. However, due to background motion and dynamic occlusion, motion activity often does not peak and trough at the desired location. As a result, motion-based landmark frame selection is often not reliable in a crowded scene.

Yet another known method uses object tilt to cluster frames with similar viewpoint from the camera. Multiple appearances of the object are obtained from the corresponding viewpoint clusters for re-identification purpose. An upright pedestrian, for example, is often captured as tilted by a high-mounted downward-looking camera if the person is not on the principal axis of the camera. When the person suddenly turns, his or her apparent tilt changes and so is his or her viewpoint from the camera. By assuming the object appearance is similar at the same viewpoint (i.e. orientation) from the camera, one can cluster frames based on the person's tilt. However, this indirect clustering method is limited to high-mounted downward-looking surveillance cameras only.

Accordingly, there exists a need for an improved object re-identification method.

SUMMARY

It is an object of at least one embodiment of the present disclosure to substantially overcome, or at least ameliorate, one or more disadvantages of existing arrangements.

According to a first aspect of the present disclosure, a method for re-identifying a query object moving from a first camera view to a second camera view is presented. The method comprising the steps of: accessing a first set of image frames captured from the first camera view and a second set of image frames captured from the second camera view, each frame in the first set of image frames including an instance of the query object and each frame in the second set of image frames including an instance of a candidate object; selecting a first representative frame from the first set of image frames and a second representative frame from the second set of image frames based on a plurality of intra-camera object appearance distances between frame pairs in each set of image frames; and re-identifying the candidate object in the second camera view as the query object in the first camera view based on at least one inter-camera object appearance distance calculated between the first representative frame and the second representative frame.

According to a second aspect of the present disclosure, a system for re-identifying a query object moving from a first camera view to a second camera view is presented. The system comprises a memory for storing data and a computer program; and a processor coupled to the memory for executing the computer program. The computer program comprises instructions for: accessing a first set of image frames captured from the first camera view and a second set of image frames captured from the second camera view, each frame of the first set of image frames including an instance of the query object and each frame of the second set of image frames including an instance of a candidate object; selecting a first representative frame from the first set of image frames and a second representative frame from the second set of image frames based on a plurality of intra-camera object appearance distances between frame pairs in each set of image frames; and re-identifying the candidate object in the second camera view as the query tracked object in the first camera view based on at least one inter-camera object appearance distance calculated between the first representative frame and the second representative frame.

According to a third aspect of the present disclosure, an apparatus for re-identifying a query object moving from a first camera view to a second camera view is presented. The apparatus includes means for accessing a first set of image frames captured from the first camera view and a second set of image frames captured from the second camera view, each frame of the first set of image frames including an instance of the query object and each frame of the second set of image frames including an instance of a candidate object; means for selecting a first representative frame from the first set of image frame and a second representative frame from the second set of image frames based on a plurality of intra-camera object appearance distances between frame pairs in each set of image frames; and means for re-identifying the candidate tracked object in the second camera view as the query tracked object in the first camera view based on at least one inter-camera object appearance distance calculated between the first representative frame and the second representative frame.

According to a fourth aspect of the present disclosure, a non-transitory computer readable medium having stored thereon a computer program for re-identifying a query object moving from a first camera view to a second camera view is presented. The computer program comprises code for accessing a first set of image frames captured from the first camera view and a second set of image frames captured from the second camera view, each frame of the first set of image frames including an instance of the query object and each frame of the second set of image frames including an instance of a candidate object; code for selecting a first representative frame from the first set of image frames and a second representative frame from the second set of image frames based on a plurality of intra-camera object appearance distances between frame pairs in each set of image frames; and code for re-identifying the candidate object in the second camera view as the query object in the first camera view based on at least one inter-camera object appearance distance calculated between the first representative frame and the second representative frame.

According to a fifth aspect of the present disclosure, a method for segmenting an image of an object for object re-identification is presented. The method includes receiving the image of the object comprising a head portion, a shoulder portion and a background; determining a centroid of the head portion; inserting a plurality of seed points in the image, where one seed point is inserted in the centroid of the head portion; segmenting the image into multiple superpixels, wherein each superpixel covers a region of homogeneous intensity around each seed point; classifying the superpixel around the centroid of the head portion as a head superpixel; classifying one or more superpixels above the head superpixel as background superpixels; classifying one or more superpixels directly under the head superpixel as shoulder superpixels; classifying any leftover superpixels as shoulder or background superpixels based on a colour similarity with any one of the previously classified superpixels; and merging the superpixels classified with the same label to obtain the segmented image.

BRIEF DESCRIPTION OF THE DRAWINGS

One or more embodiments of the present disclosure will now be described with reference to the following drawings and appendices, in which:

FIGS. 9A-9C are schematic diagrams showing an example intra-camera pairwise distance matrix;

DETAILED DESCRIPTION

Figure 1:
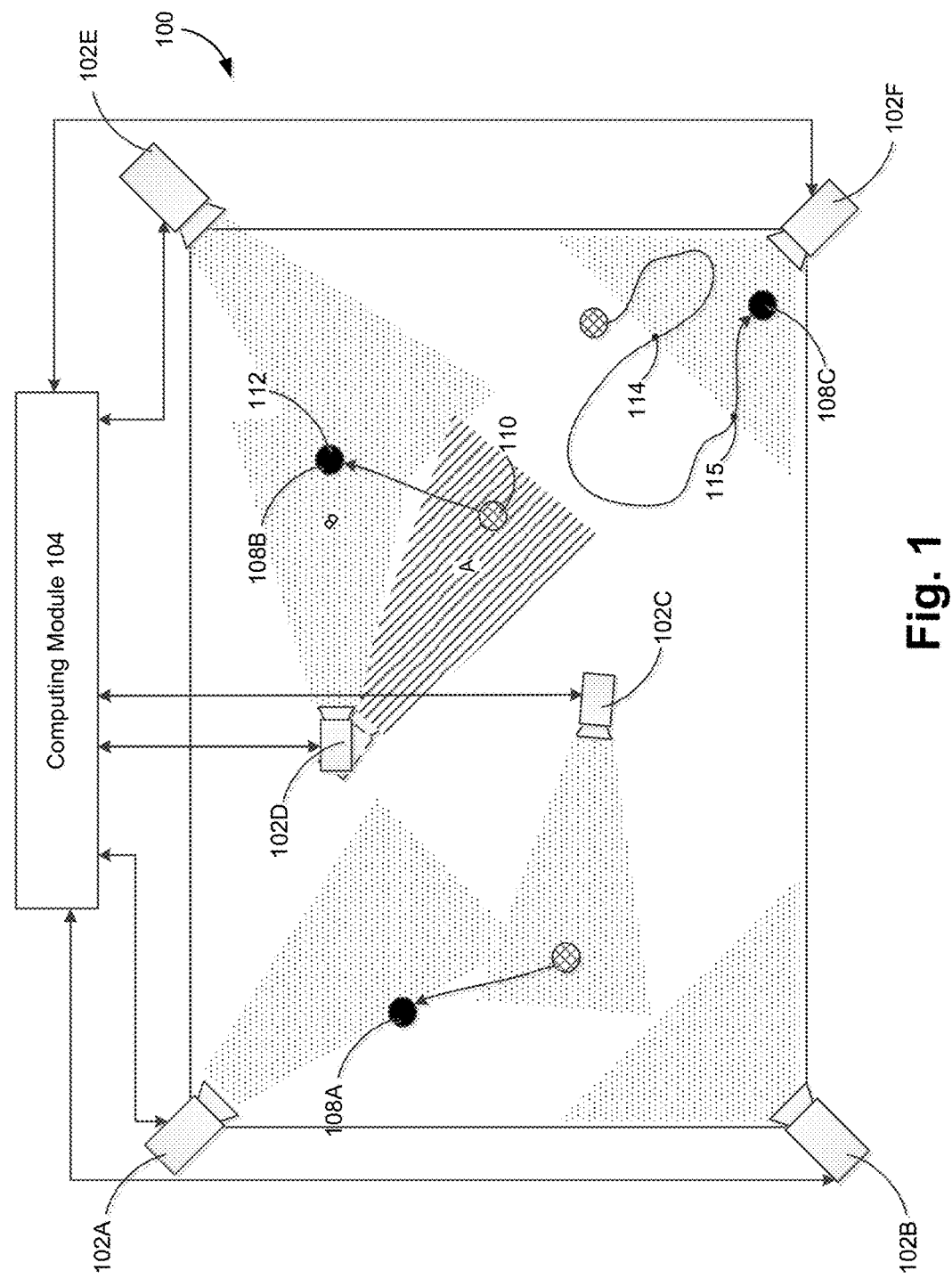
FIG. 1 is a schematic diagram of a surveillance network monitoring an area according to one aspect of the present disclosure FIGS. 2A and 2B form a schematic block diagram of a camera, upon which described methods may be practiced.

Where reference is made in any one or more of the accompanying drawings to steps and/or features, which have the same reference numerals, those steps and/or features have for the purposes of this description the same function(s) or operation(s), unless the contrary intention appears.

Aspects of the present disclosure relate to systems and methods for re-identifying a tracked object. The systems and methods are configured to select representative frames from sets of frames of the tracked object and a candidate object and compare the representative frames to determine whether the candidate object matches the tracked object.

In summary, the object re-identification method disclosed herein uses a small number of representative frames from each camera view for efficiency purpose. These representative frames are selected based on visual similarities of the tracked object in multiple frames within a single camera view.

FIG. 1 is a schematic diagram of a surveillance network 100, where aspects of the present disclosure may be employed. The surveillance network 100 includes multiple cameras 102A, 102B, 102C . . . 102F (commonly referred to as "cameras 102") and a computing module 104.

The cameras 102 may be pan tilt zoom (PTZ) cameras, wide-angle static cameras or any other type of cameras, such as handheld cameras. In FIG. 1, cameras 102A, 102C, 102D, and 102E are depicted as PTZ cameras, while cameras 102B and 102F are depicted as static wide-angle cameras. The cameras 102 may monitor one or more objects 108A, 108B, or 108C (commonly referred to as objects 108) in area 106. Furthermore, the cameras 102 may be configured to capture front facial images of the objects 108 or persistently track the movement of the objects 108. To that end, the camera 102 capture input images representing the visual content of a scene appearing in the field of view of the camera 102. The visual content may include one or more foreground objects and one or more background objects.

Furthermore, the computing module 104 may be configured to control movement of the cameras 102 to capture the input images, facilitate handover of tracked objects from one camera to another, and aid in re-identification of a tracked object.

Re-identification of an object may be required in multiple situations. One such situation may arise when a tracked object exits the physical viewing limit of a first camera and enters the physical viewing limit of a second camera. This situation is illustrated in FIG. 1 with reference to object 108A, which exits the physical viewing limit of camera 102C and enters the physical viewing limit of camera 102A. Another situation may arise when a camera is panned and/or tilted to track movement of an object. This situation is illustrated in FIG. 1 with reference to object 108B, which moves from point 110 to point 112, thereby causing camera 102D to pan from view A to view B. A third situation may arise when an object being tracked by a camera exits the physical viewing limit of the camera and then re-enters the physical viewing limit of the camera at a later time. This situation is illustrated in FIG. 1 with reference to object 108C, which exits the physical viewing limit of fixed camera 102F at point 114 and then re-enters the physical viewing limit of the camera 102F at point 115.

Figure 2A:
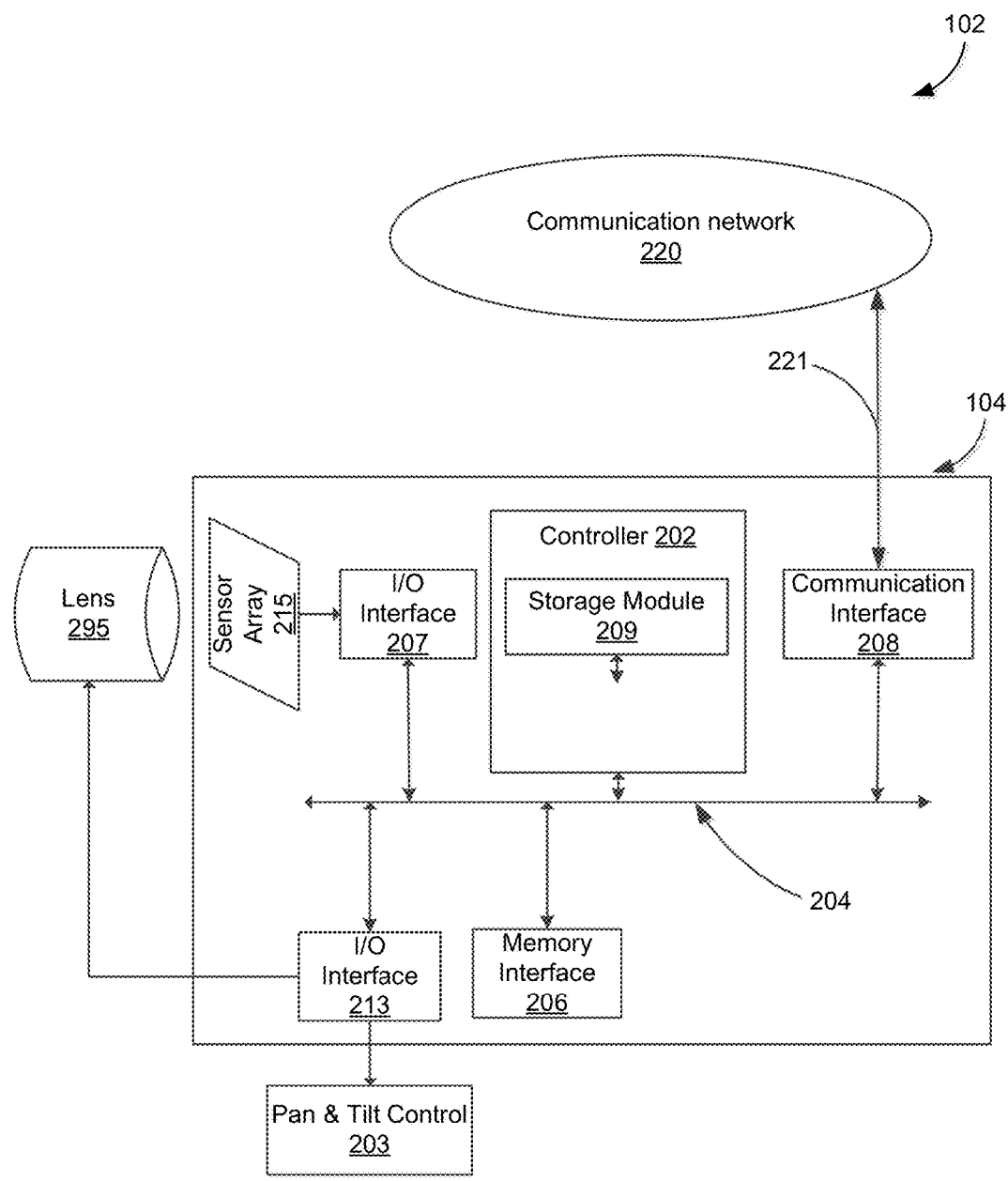
Figure 2B:
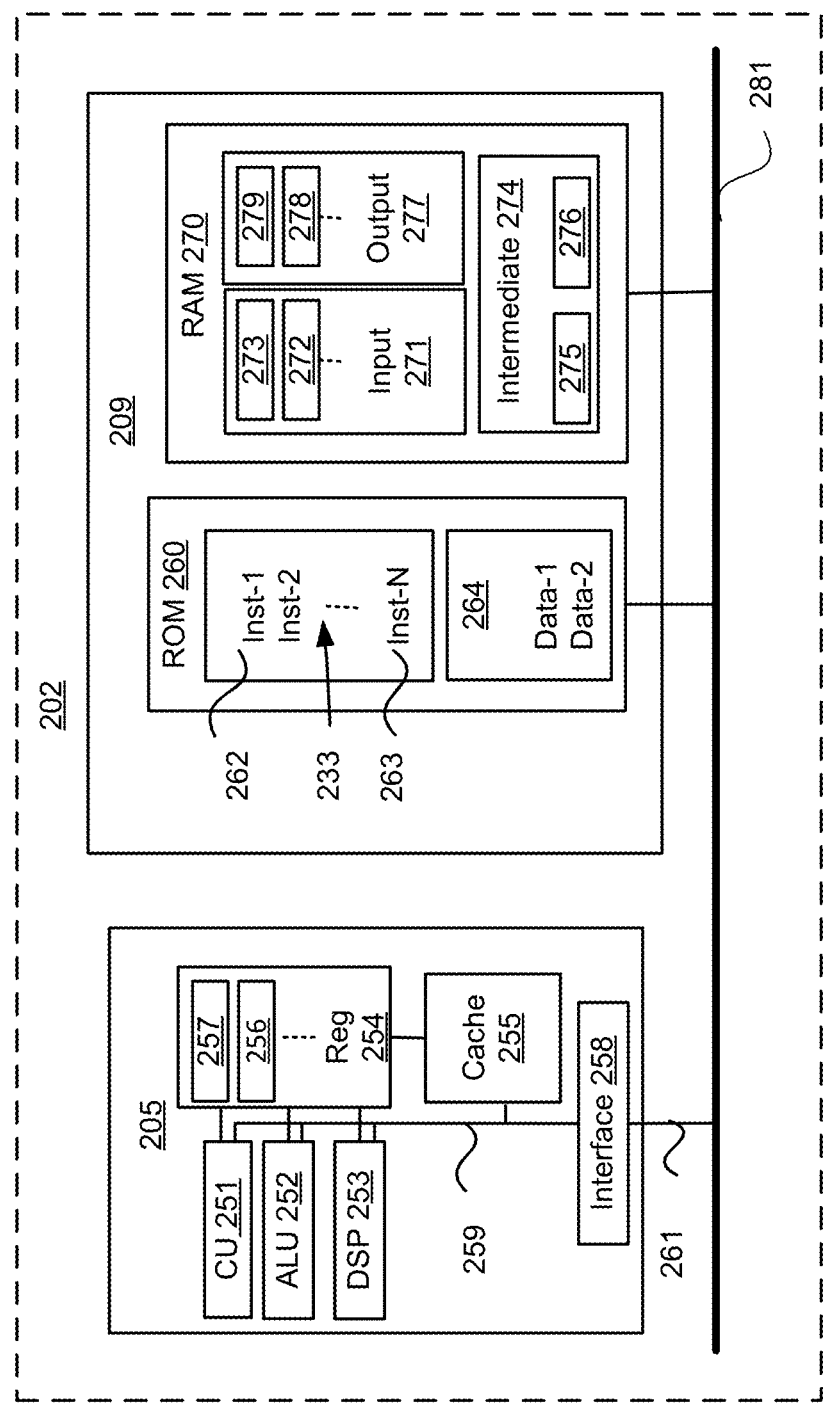

In all such situations, the computing module 104 is configured to aid a camera in re-identifying a previously tracked object/object. To that end, the computing module 104 accesses sets of images captured by one or more cameras, selects representative images from the sets of images, and compares the representative images to re-identify the tracked object. FIGS. 2A and 2B describe the functions of the computing module 104 in detail.

In one aspect, the computing module 104 is embedded in each camera 102 and may be configured to communicate with computing modules 104 of other cameras 102 through a network connection. Alternatively, the computing module 104 may be centrally hosted on a separate computing device and may be configured to communicate with all the cameras 102 in the surveillance network 100.

In yet another aspect, some components of the computing module 104 may be embedded in each camera 102, while other components of computing module 104 may be centrally hosted on a networked computing device without departing from the scope of the present disclosure.

FIGS. 2A and 2B illustrate the embodiment in which the computing module 104 is embedded in each camera 102 of the surveillance network 100. Specifically, FIGS. 2A and 2B are schematic block diagrams of the camera 102, upon which described methods may be practiced. In one embodiment, the camera 102 may be a pan-tilt-zoom (PTZ) camera. However, in other embodiments, the camera 102 may be a wide-lens camera, a static field-of-view camera, a wearable camera or a handheld camera without departing from the scope of the present disclosure.

The camera 102 includes the computing module 104, a pan and tilt module 203, and a lens system 295. As seen in FIG. 2A, the computing module 104 comprises an embedded controller 202. In the present example, the embedded controller 202 includes at least one processor unit 205 (or processor) which is bi-directionally coupled to a storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

As seen in FIG. 2A, the computing module 104 may also include a portable memory interface 206 coupled to the processor 205. The portable memory interface 206 allows a complementary portable memory device (not shown) to be coupled to the computing module 104 to act as a source or destination of data or to supplement the storage module 209. The memory interface 206 may allow coupling with portable memory devices such as Universal Serial Bus (USB) memory devices, Secure Digital (SD) cards, Personal Computer Memory Card International Association (PCMIA) cards, optical disks or magnetic disks.

The computing module 104 also includes an input/output (I/O) interface 207 coupled to a photo-sensitive sensor array 215 and a communication interface 208 coupled to a communication network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The computing module 104 also comprises an I/O interface 213 to provide instructions to the pan and tilt module 203 and the lens system 295. The pan and tilt module 203 is configured to receive instructions from the computing module 104 to pan, tilt, zoom in or zoom out to track an object, and to provide the current pan tilt and zoom values to the computing module 104. The lens system 295 is configured to capture image frames of the scene within the field of view of the camera 102.

The sensor I/O interface 207, the embedded controller 202, the communications interface 208, the control interface 213 and the storage module 206 typically communicate via an interconnected bus 204 and in a manner which results in a conventional mode of operation known to those in the relevant art.

The described methods may be implemented using the embedded controller 202, where the processes of FIGS. 3 to 6 may be implemented as one or more software application programs 233 executable within the embedded controller 202. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

Referring to FIG. 2B, the software 233 is typically stored in the non-volatile ROM 260 of the internal storage module 209. The software 233 can be loaded into and executed by the processor 205, and when required, updated from a computer readable medium. In some instances, the processor 205 may execute software instructions that are located in the RAM 270. Software instructions may be loaded into the RAM 270 by the processor 205 initiating a copy of one or more code modules from the ROM 260 into the RAM 270. Alternatively, the software instructions of one or more code modules may be pre-installed in a non-volatile region of the RAM 270 by a manufacturer. After one or more code modules have been located in the RAM 270, the processor 205 may execute software instructions of the one or more code modules.

The application program 233 is typically pre-installed and stored in the ROM 260 by a manufacturer, prior to distribution of the computing module 104. However, in some instances, the application programs 233 may be supplied to the user encoded on one or more computer readable media or external memory device (not shown) and read via the portable memory interface 206 of FIG. 2A prior to storage in the internal storage module 209 or in the portable memory as described above. In another alternative, the software application program 233 may be read by the processor 205 from the network 220. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the computing module 104. Examples of transitory or non-tangible computer readable transmission media that may also participate in the provision of software, application programs, instructions and/or data to the computing module 104 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 2B illustrates in detail the embedded controller 202, the storage module 209, and the processor 205 for executing the application programs 233. The module storage 209 includes read only memory (ROM) 260 and random access memory (RAM) 270. The processor 205 is configured to execute the application programs 233 stored in one or both of the connected memories 260 and 270. When the computing module 104 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processing (DSP) unit 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 through 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the computing module 104. Typically, the application program 233 waits for events and subsequently executes the block of code associated with that event. Events may be triggered in response to input from the interfaces 207, 208 and 213 of the computing module 104.

The execution of a set of the instructions may require numeric variables to be read and modified. Such numeric variables are stored in the RAM 270. The described methods use input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

As described previously, the computing module 104 may be centrally hosted on a computing device. In that case, the computing module 104 may be coupled to the one or more cameras 102 of the surveillance network 100 through the communication interface 208 and the communication network 220. Furthermore, the computing module 104 may receive images from the sensor array 215 of the camera 102 and provide pan tilt or zoom instructions to the pan and tilt control 203 through the communication network 220. The received images may be stored in the storage module 209.

Alternatively, a computing module 104 may be embedded in the cameras 102 and another computing module 104 may be centrally hosted in a computing device. The computing module 104 of the cameras 102 may be configured to execute one or more applications, such as selecting representative frames from a set of image frames, while the central computing module 104 may be configured to execute other applications, such as matching object and candidate objects and re-identifying an object.

Each step or sub-process in the processes of the methods described below is associated with one or more segments of the application program 233, and is performed by repeated execution of a fetch-execute cycle in the processor 205 or similar programmatic operation of other independent processor blocks in the computing module 104.

The camera 102 is used to capture video frames representing visual content of a scene appearing in the field of view of the camera 102. Each video frame is an image captured by the camera 102. The described methods may be configured to extract foreground objects and match the extracted foreground objects across frames from different cameras. The foreground objects may also be referred to as "objects" or "query objects".

Figure 3:
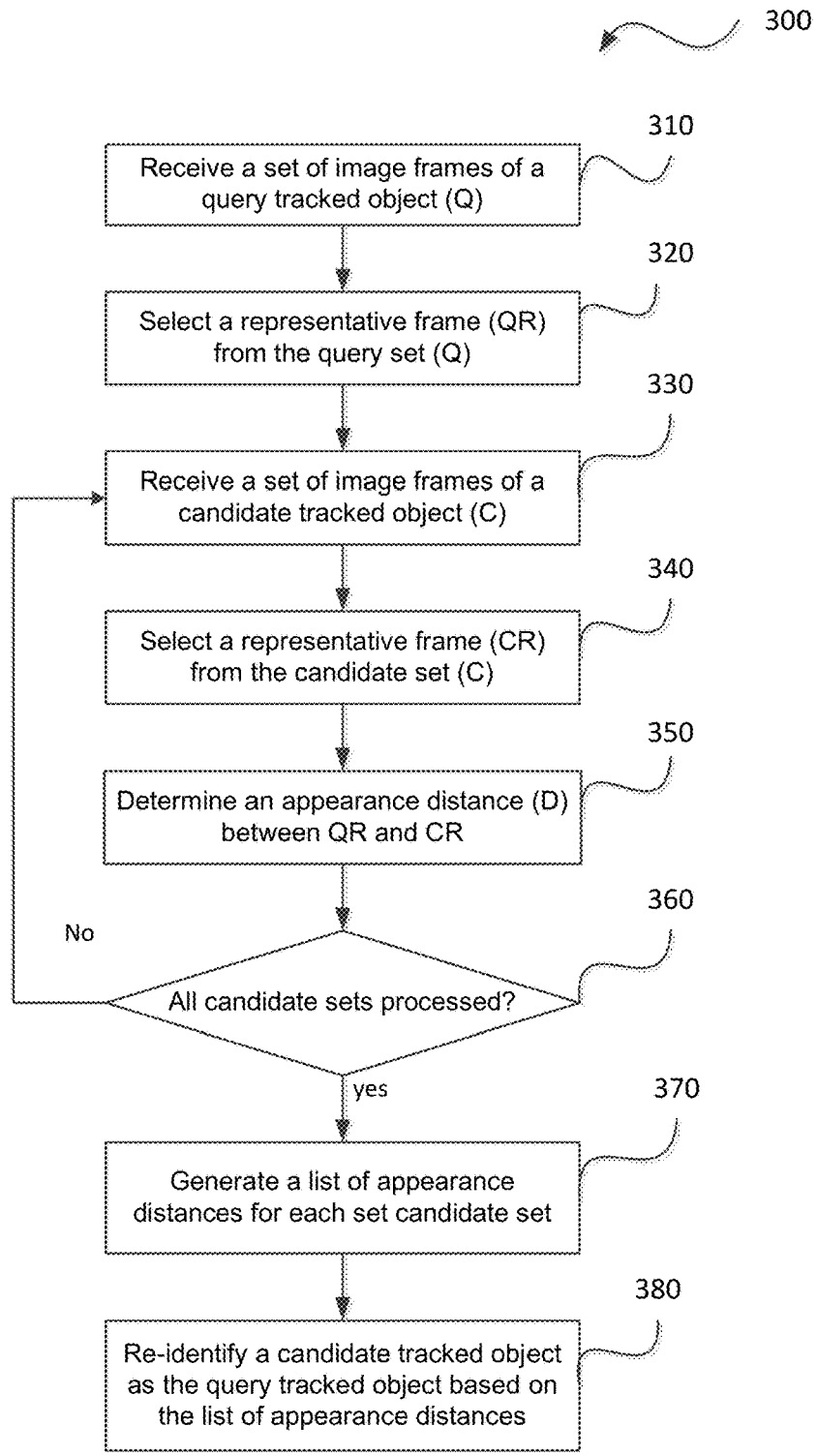
FIG. 3 is a schematic flow diagram showing a method of performing tracked object re-identification.

FIG. 3 is a schematic flow diagram showing a method 300 of performing object re-identification according to one aspect of the present disclosure.

The method 300 performs object re-identification between two sets of video frames, where each set of video frames represents a view of the camera 102. In situation 1, a first camera (i.e., camera 102C) may capture the first video frame while a second camera (i.e., camera 102A) may capture the second video frame. In situation 2, one camera (i.e., camera 102D) captures both the video frames. The first frame is captured when the camera 102D in position A and the second frame is captured when the camera 102D is in position B. In situation 3, the same camera (i.e., camera 102F) captures the first and second video frames, but one video frame is captured when the object is initially in the view and the second frame is captured when the object returns in the view.

Figure 7:
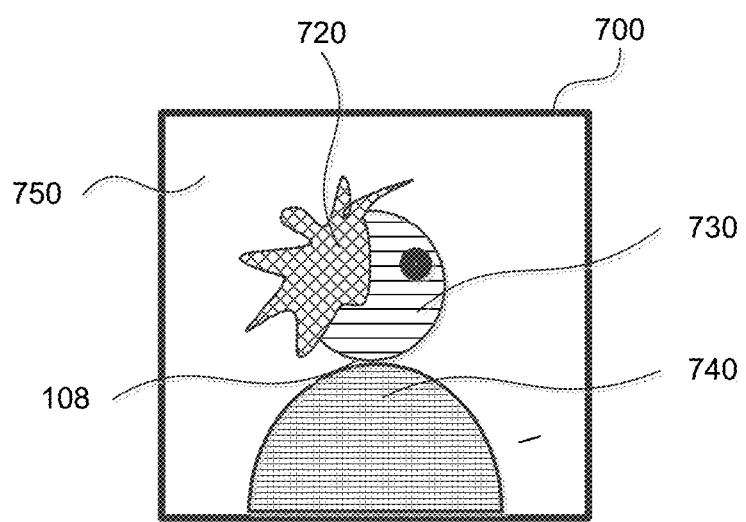
FIG. 7 is a schematic diagram showing an image of a human head object.

As described here, the term "frame" refers to a portion of a video image captured by the camera 102 where boundaries of the image portion define a "tight crop" around a foreground object of interest within the image captured by the camera 102. To be considered a tight crop frame, the object of interest occupies more than 30% of the frame. For example, FIG. 7 shows an example frame 700, which represents a tight crop of an object 108 including the object's head 730 and shoulder 740. The headshot may also contain region of non-interest such as background 750. The head 730 may also contain hair region 720. The computing module 104 receives the frame 700 at step 310 from the storage module 209.

The method 300 is described with reference to the frame 700 and the object 108 representing a person's head and shoulders.

The method 300 begins at step 310, where a set of image frames of a query tracked object (Q) is received by the processor 105. The query set (Q) may be accessed at step 310 from the storage module 209 and it may include one or more query frames.

At step 320, at least one representative frame is selected from the query set Q. The representative frame(s), "QR", is an image frame whose object appearance is similar to that of many other frames in the query set Q. A representative frame of a set of head shots of a tracked object 108 captures a head pose that frequently appears in the query set Q. If during video capture, the tracked object 108 changes his/her body pose or head orientation, multiple representative frames can be selected, each representative frame represents a frequently appeared body pose and/or head orientation. A method 400 of determining at least one representative frame from a set of image frames is described with reference to FIG. 4.

At step 330, a set of image frames of a candidate object (C) is received by the processor 205. In one aspect, the processor 205 may retrieve the candidate set C from the storage module 209. The candidate set C is also a portion of a video sequence captured by camera 102 where boundaries of the image portion define a tight crop around an object of interest such as the object 108 of the frame 700. The candidate set C may include one or more image frames of the candidate tracked object. Each candidate frame represents a view of an object 108 in an image captured by the camera 102. The object 108 in each candidate image set C may or may not be the same as the object 108 in the query set Q.

Subsequently, at step 340, at least one representative frame is selected from the candidate set C. The representative frame(s) of the candidate set may be referenced here as "CR".

Next, an appearance distance (D) between the query representative frame QR and the candidate representative frame CR is determined at step 350. The lower the appearance distance (D) determined at step 350, the higher the likelihood that the object 108 in the candidate image sequence (C) is the same as the object 108 in the query image sequence (Q). A method 600 of computing the appearance distance between two frames, as executed at step 350, will be described below with reference to FIG. 6.

The method determines if all candidate image sets C are processed at step 360. If all candidate sets C are processed, the method proceeds to step 370. Otherwise, the method 300 returns to step 330 and steps 330 to 360 are repeated until all the captured candidate image sets are processed. At step 370, a list including the calculated appearance distances D for each candidate image set is generated and at step 380, a candidate tracked object 108 is re-identified as the query tracked object 108 based on the appearance distances. One method of determining if the candidate image set C matches the query image set Q is to compare the object appearance distance (D) to a threshold value. When the appearance distance is lower than the threshold value, the candidate object 108 in candidate set C is considered to match the query object 108 in query set Q.

Figure 4:
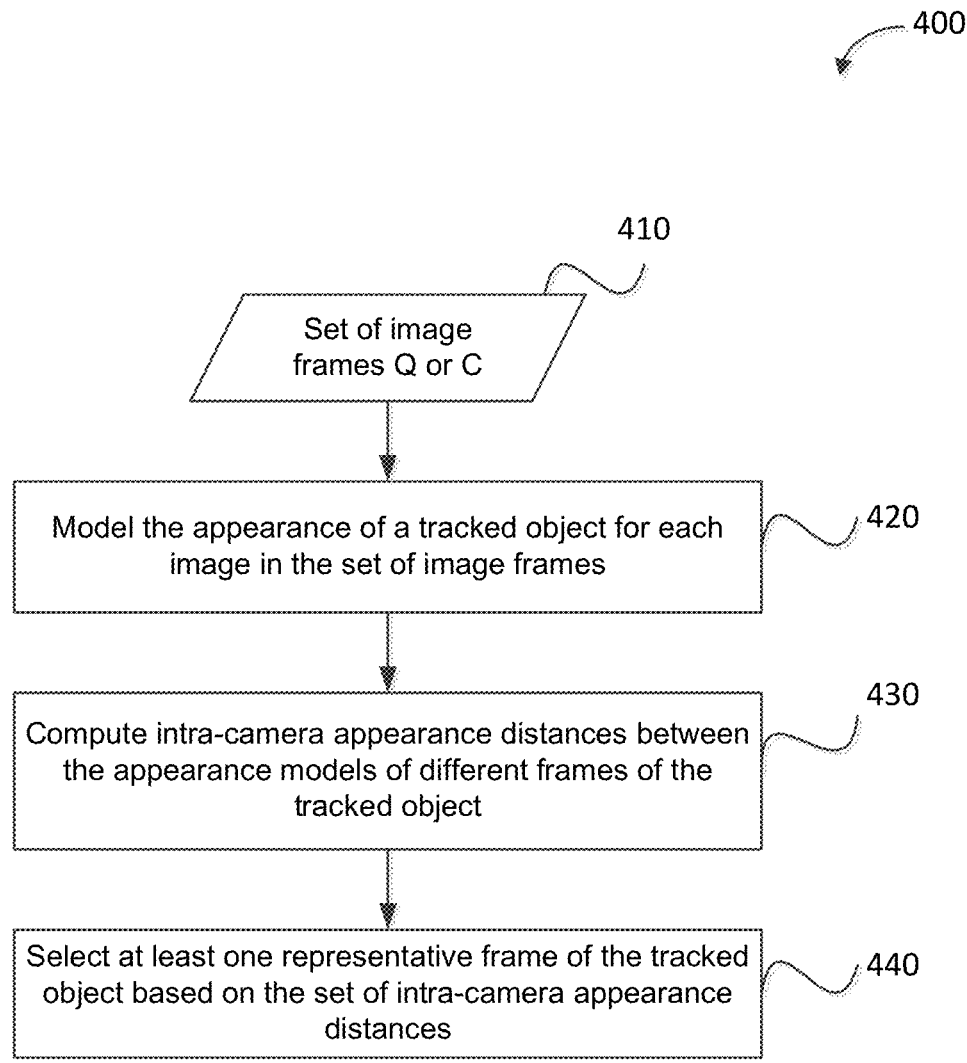
FIG. 4 is a schematic flow diagram showing a method of determining at least one representative frame of the tracked object, as executed in the method of FIG. 3.

FIG. 4 is a flowchart illustrating a method 400 for selecting at least one representative frame from a set of image frames of a tracked object, as executed at steps 320 and 340.

Figure 5:
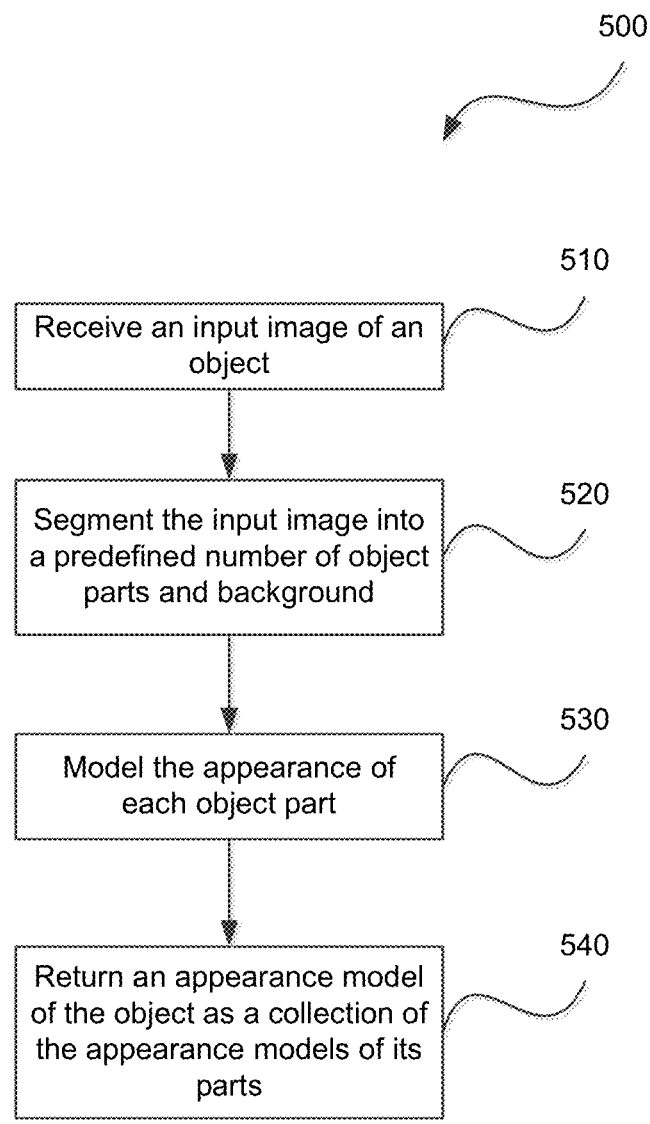
FIG. 5 is a schematic flow diagram showing a method of determining an appearance model of an object from its image, as executed in the method of FIG. 4.

The method 400 begins at step 420, where the processor 205 models the appearance of an object 108 in the set of image frames of the query or candidate object retrieved at step 310 or 330. Any known technique may be employed to model the object 108 in the image frames without departing from the scope of the present disclosure. FIG. 5 depicts an exemplary method for modelling the appearance of an object, according to one aspect of the present disclosure.

Next, at step 430, a set of intra-camera appearance distances between the appearance models of the image frames of the tracked object is determined. An example of intra-camera appearance distances between each frame pair of the image set Q is illustrated in FIG. 9A, where table 905 is a matrix of 8-by-8 intra-camera pairwise distances between eight frames of an image set. The frame index (0, 1, 2 . . . 7) is annotated along the horizontal axis 910 and the vertical axis 920. Note that the distances along the diagonal are 0 because the appearance distance between an object in a frame and itself is 0.

The example illustrated in FIG. 9A shows a full N-by-N pairwise distance matrix (where N=8 is the number of frames in the image sequence). In practice, not every pairwise distance needs to be computed for representative frame selection.

Once the intra-camera appearance distances are calculated between pairs of frames in a set, the method proceeds to step 440, where at least one representative frame of the object 108 is selected based on the set of intra-camera appearance distances computed in step 430.

An example 900 of determining a representative frame based on the appearance distances will be now described with reference to FIGS. 9B and 9C. The appearance distances in table 905 follow a bi-modal distribution. Most appearance distances between frames are small (with values below 12). For instance, the distance between frames 3 and 1 is 8 (reference numeral 930). However, there also exist a number of large distances between frames (with values above 29). For instance, the distance between frames 4 and 5 is 92 (reference numeral 940). The large distances are shown in bold in table 905.

The low pairwise distances correspond to frame pairs with similar looking objects 108, while the high pairwise distances correspond to frame pairs with at least one outlier frame. Outlier frames (i.e., frames that have objects having a different appearance to the majority of other frames in the set) are not representative of the image set and therefore these frames are not selected as representative frames. Instead, one or more inlier frames (i.e., frames that have object appearances similar to the majority of the other frames in the set) is selected as the representative frame.

One way to detect outlier frames is to compare the pairwise distances with a threshold value. Alternatively, the pairwise distances are averaged and the average pairwise distances are compared with a threshold value. Array 960 in FIG. 9B shows average pairwise distances for each column of the matrix 905, where the first value in the array 960 corresponds to the average of the first column in Table 905 and so on. Note again that these average pairwise distances also follow a bi-modal distribution. As a result, a proper threshold can partition the array to an inlier set, whose values are below the threshold, and an outlier set, whose values are above the threshold.

An automatic thresholding method such as Otsu's maximizing interclass variance method or Rosin's unimodal thresholding method can be used. Using an outlier detection threshold of 40, two outliers 970 and 975, having values 49.4 and 71.6, are detected in array 960. These outlier values (shown in bold) correspond to outlier frames 5 and 6 (reference numeral 950 in FIG. 9A). Frames 0, 1, 2, 3, 4 and 7 are therefore inliers. The pairwise distances between an inlier frame and an outlier frame are highlighted in bold in table 905. It is clear that the inlier-to-outlier distances are significantly higher than the inlier-to-inlier distances or the outlier to outlier distances (not in bold).

Once the outlier frames are detected and removed, a representative frame can be detected from the remaining inlier frames. Array 980 in FIG. 9C shows the column average of the matrix 905 after outlier removal. Note that the average inlier distances in array 980 are lower than the average distances in array 960 because the average inlier distances are not corrupted by the high outlier distances in table 905.

A representative frame CR or QR can be selected as the frame with minimum average inlier distance. In array 980, frame 3 (reference numeral 990) is selected as the representative frame because of its minimum average distance value of 6.

In this way, a representative frame may be selected that is closest to the rest of the inlier cluster of image frames and can therefore represent the image frame set in future processing. Under this closeness criterion, the medoid of the inlier cluster can also be selected as a representative frame.

Example 900 illustrates a case where there is a single cluster of inlier frames with an exception of a few outliers. One representative frame is enough to represent one inlier cluster. In practice, there may be cases with multiple appearance clusters, where the intra-cluster distances are small and inter-cluster distances are large. Each cluster may correspond to a certain pose of the object. For example, if a pedestrian turns and walks along a different direction, the set of frames before the turn, capture one pose and the set of frames after the turn, capture a different pose. Each pose forms an appearance cluster. Multiple clusters can be detected one at a time using the inlier-outlier threshold method discussed previously in FIG. 9A. After a cluster is found amongst the inliers, the outlier frames are subjected to another run of inlier-outlier threshold method to extract further clusters, if any. The inlier clusters are formed such that object appearance distances between frame pairs in a cluster are lower than a cluster formation threshold and object appearance distances between frame pairs from different clusters are higher than the cluster formation threshold. Furthermore, object appearance distances between a frame from an inlier cluster and a frame from an outlier cluster are higher than an outlier detection threshold. It will be understood that the present disclosure is not limited to the method of determining inlier and outlier clusters described with reference to FIGS. 9A-9C. Instead, any known clustering method such as spectral clustering can also be used to detect the presence of multiple clusters from a pairwise distance matrix without departing from the scope of the present disclosure.

An exemplary method 500 for modelling the appearance of an object 108, as executed at step 420, will now be described with reference to FIG. 5. Furthermore, the method 500 is described by way of example with reference to the query object 108 in the input frame 700.

The method 500 begins at receiving step 510, where the input image 700 of an object 108 is received by the processor 205. At step 520, the input image 700 is segmented into a predefined number of object parts and background. For example, if the input image is a head shot as shown in FIG. 7, it can be segmented into three object parts—a) head, b) shoulders, and c) background. The head and shoulder segments are representative of an object while the background is ignored during matching.

The process of segmenting the input image 700 into a predefined number of object parts and background is now described with reference to FIG. 8A-8D.

Figure 8A:
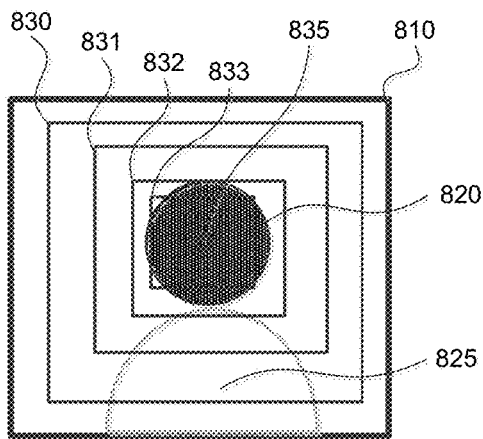
FIGS. 8A-8D are schematic diagrams showing a method of segmenting an image of a human head object into its body parts.

First, a head centroid is detected by mode seeking on a skin tone image. The skin tone image in FIG. 8A is computed using a Gaussian skin hue model in the normalised rg colour space. Given an RGB colour triplet at each pixel, the rg colour is normalised by the total lightness R+G+B:

$$r = \frac{R}{R+G+B} \quad g = \frac{G}{R+G+B} \quad (1)$$

Using the Gaussian skin hue model $\mu=(\mu_r,\mu_g)$ and $$\Sigma = \begin{pmatrix} \sigma_r^2 & \sigma_r\sigma_g/\rho \\ \sigma_r\sigma_g/\rho & \sigma_g^2 \end{pmatrix},$$

where $\mu_r=0.434904$, $\mu_g=0.301983$, $\sigma_r=0.053375$, $\sigma_g=0.024349$, $\rho=0.5852$, the skin response of a normalised rg colour is computed as:

$$h(r,g) = \exp\left[-\frac{1}{2}\left(\frac{(r-\mu_r)^2}{\sigma_r^2} + \frac{(g-\mu_g)^2}{\sigma_g^2} - \frac{\rho(r-\mu_r)(g-\mu_g)}{\sigma_r\sigma_g}\right)\right] \quad (2)$$

The skin hue in equation 2Error! Reference source not found. gives high response to skin across many ethnicities. This high response around the face is illustrated by the shaded region 820 in FIG. 8A. If the colour of the shoulder region 740 does not resemble skin, the shoulder will have a small skin response as illustrated by region 825 in FIG. 8A. Assuming there is only a single region 820 of significant number of skin pixels in the image, the centroid of this region can be found by mean-shift mode seeking.

In mean-shift mode seeking, starting with a rectangular region, the whole image is covered and the centre of mass (CoM) of the skin response is computed. An enclosing window of a reduced size 830 (e.g., by 80%) is then centred at this initial CoM. A new CoM is computed over the reduced size window 830. This mean-shift process is iterated with successively smaller windows 831, 832, 833 . . . until the density of skin response within the window reaches a high threshold (e.g., 0.7), where density is defined as the average skin response within the window divided by the maximum skin response within the window. Mean-shift CoM typically converges when the enclosing window shrinks to fit the face region. Due to normalisation of the density by the maximum intensity within the window, mean-shift can converge to a weak but homogeneous area of skin response (e.g., hats or hair satisfy this condition). An example is illustrated in FIG. 8A, where the mean-shift CoM converges to a tight bounding box 833 covering the head of the object 108. The centre 835 of this converging window is called a head centroid.

Once the head centroid is determined, the input image 810 may be segmented into multiple superpixels. In one aspect, the input image 810 is segmented into 13 superpixels. However, it will be understood that in other embodiment, the image 810 may be segmented into lesser or more number of superpixels without departing from the scope of the present disclosure. Each superpixel tends to cover a compact region of homogeneous intensity. As a result, each superpixel generally belongs to one class (head, shoulder, or background). To generate the super pixels, 13 initial seed points are selected-one at the detected head centroid 835 and 12 equally spaced on the image boundary (drawn as a small circle such as 836 in FIG. 8B). The initial seeds can be slightly perturbed by a maximum displacement of $1/12^{th}$ the image's width away from edges prior to segmentation.

Figure 8B:
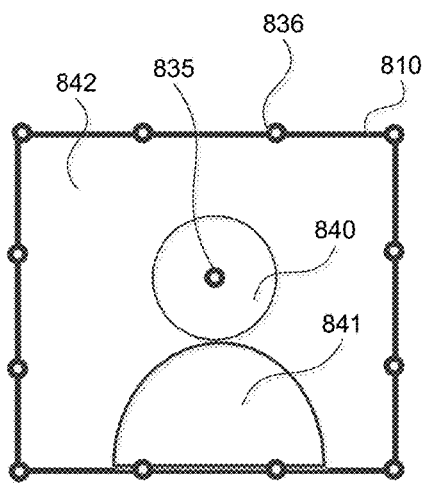
Figure 8C:
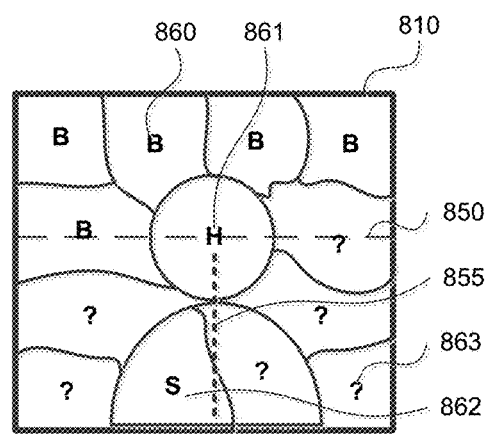
Figure 8D:
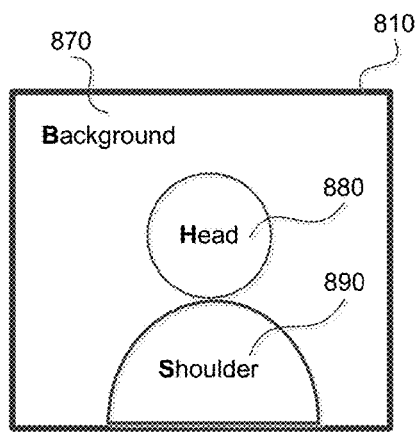

FIG. 8B shows an edge response image where pixels on the boundaries of the head 840 and the shoulder 841 are higher than other pixels in the image. FIG. 8C shows a typical superpixel segmentation, where the centroid of each superpixel is marked with either letter "B" for background (e.g. 860), "H" at 861 for head, "S" at 862 for shoulder or "?" for unknown label (e.g. 863).

The superpixels are then classified into 3 classes—head, shoulder, or background. The head centroid seed 835 grows into a head segment. The remaining 12 superpixels are either labelled as shoulder or background. For an upright person, the shoulder always lies below the head. As a result, all superpixels whose centroids are above the head centroid (i.e. above the horizontal line 850) are labelled as background. Assuming the shoulder is directly below the head, the bottom superpixels intersecting the vertical line 855 are labelled as shoulder. The remaining unclassified superpixels such as 863 are labelled with an "?" in FIG. 8C.

The remaining unclassified superpixels are finally classified into either shoulder or background by colour similarity with the previously classified superpixels. The final classification result is provided in FIG. 8D, where the input image 810 is segmented into head 880, shoulder 890 and background 870 regions after merging superpixels with same label.

Referring back to FIG. 5, the method subsequently models the appearance of each segmented object part at step 530. Since the object parts are likely to have different visual appearances, each object part is modelled separately. In case the input image is a head shot, the appearance of head and shoulder are modelled independently. The part-based appearance model can be a colour histogram or a mixture of Gaussian colour model.

In case Gaussian colours are used to model the appearance of each object part in an input image, each part is modelled by a mean colour $\mu$ and a covariance matrix $\Sigma$. To make compact Gaussian colour models, the pixel intensities of the input image are transformed to a decorrelated colour space so cross-channel correlation can be ignored (i.e. making the covariance matrix $\Sigma$ diagonal). For example, the input RGB values obtained from a surveillance camera can be transformed to the JPEG YCbCr colour space in floating point format. The Y channel is also divided by 8 in equation 3 to reduce the influence of different lighting across cameras. This division also has the effect of equalising the dynamic ranges of the 3 colour channels YCbCr.

$$\begin{bmatrix} Y \\ Cb \\ Cr \end{bmatrix} = \begin{bmatrix} 0.299/8 & 0.587/8 & 0.114/8 \\ -0.1687 & -0.3313 & 0.5 \\ 0.5 & -0.4187 & -0.0813 \end{bmatrix} \begin{bmatrix} R \\ G \\ B \end{bmatrix} \quad (3)$$

$$\mu = \begin{bmatrix} \mu_Y \\ \mu_{Cb} \\ \mu_{Cr} \end{bmatrix} \quad \Sigma = \begin{bmatrix} \sigma_Y^2 & 0 & 0 \\ 0 & \sigma_{Cb}^2 & 0 \\ 0 & 0 & \sigma_{Cr}^2 \end{bmatrix}$$

Equation 3 shows the mean colour $\mu$ is a vector of three colour means $\mu_Y$, $\mu_{Cb}$, $\mu_{Cr}$ of the object part in the corresponding colour channels Y, Cb, Cr. The covariance matrix $\Sigma$ is a 3-by-3 diagonal matrix whose diagonal entries $\sigma_Y^2$, $\sigma_{Cb}^2$, $\sigma_{Cr}^2$, are the variance of the colour values Y, Cb, Cr of the object part.

The method 500 concludes at step 540, where the appearance model of the object 108 in the input image 700 is returned as a collection of the appearance models of its parts.

Figure 6:
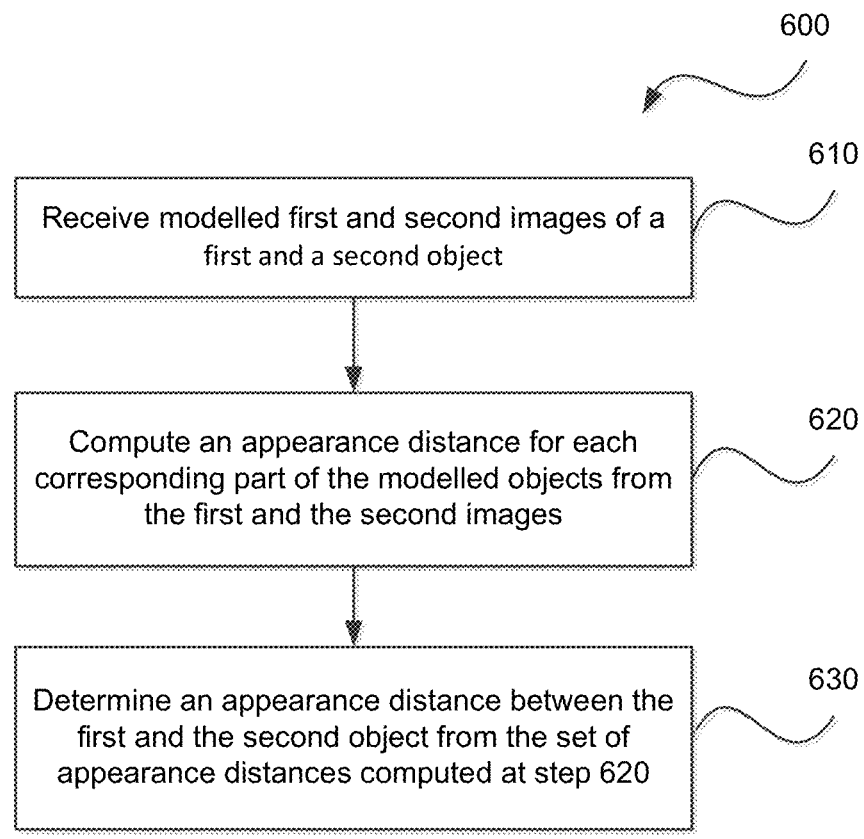
FIG. 6 is a schematic flow diagram showing a method of determining an appearance distance between two objects from their images, as executed in the method of FIG. 3.

A method 600 of computing the appearance distance between inter-camera or intra-camera frames, as executed at step 350 or step 430, is described with reference to FIG. 6. The method 600 begins at receiving step 610, where modelled first and second images are received. The modelled images may include a representative query image QR and a representative candidate image CR. Alternatively, the first and second images may include a pair of image frames from a set of image frames, such as a query set or a candidate set. Moreover, the appearance of objects 108 in the first and second images are modelled as a collection of appearance models of the parts of the objects 108 as computed in method 500.

At step 620, the processor 205 computes part-based distances for each corresponding part of the modelled objects from the first and the second images. Method 600 concludes at step 630, where an appearance distance is calculated between the first and second images from the set of part-based distances computed in step 620.

Using Gaussian colour appearance model, appearance distances between corresponding parts of two different segmented objects (part-based distances) can be computed using the Fréchet distance. For diagonal covariance matrices, the Fréchet distance between two Gaussian distributions $X \in N(\mu_x, \Sigma_x)$ and $Y \in N(\mu_y, \Sigma_y)$ is also the Fröbenius distance:

$$D_F(X, Y) = \sum_{i=Y,Cb,Cr} (\mu_x^i - \mu_y^i)^2 + (\sigma_x^i - \sigma_y^i)^2 \quad (4)$$

For headshot images with two parts, i.e., a head and shoulders, the matching score between the headshot images is measured as the product of the Fréchet distance between the shoulder colours and the square root of the Fréchet distance between the head colours:

$$D_A(\text{object}_1, \text{object}_2) = D_F(\text{shoulder}_1, \text{shoulder}_2) \times \sqrt{D_F(\text{head}_1, \text{head}_2)}. \quad (5)$$

The appearance distance of the head segment in equation (5) is treated with a lower power than the appearance distance of the shoulder segment because the appearance of the head segment is less consistent (as it can appear as either face or hair depending on the direction of the head with respect to the camera) and less discriminative (as people of the same ethnicity often have similar skin colour).

Re-identifying an object by using a small set of representative frames has a number of advantages. First, the number of image comparisons is significantly reduced compared to matching every frame from the first image set Q to every frame from the second image set C. Second, because outlier frames are removed during representative frame selection, these frames do not corrupt the computed appearance distances and hence the matching result. Finally, the matching scores from representative frames QR and CR can be more discriminative than average matching scores from all frame pairs. This advantage is elucidated by two examples illustrated in FIGS. 10A-10B.

Figure 10A:
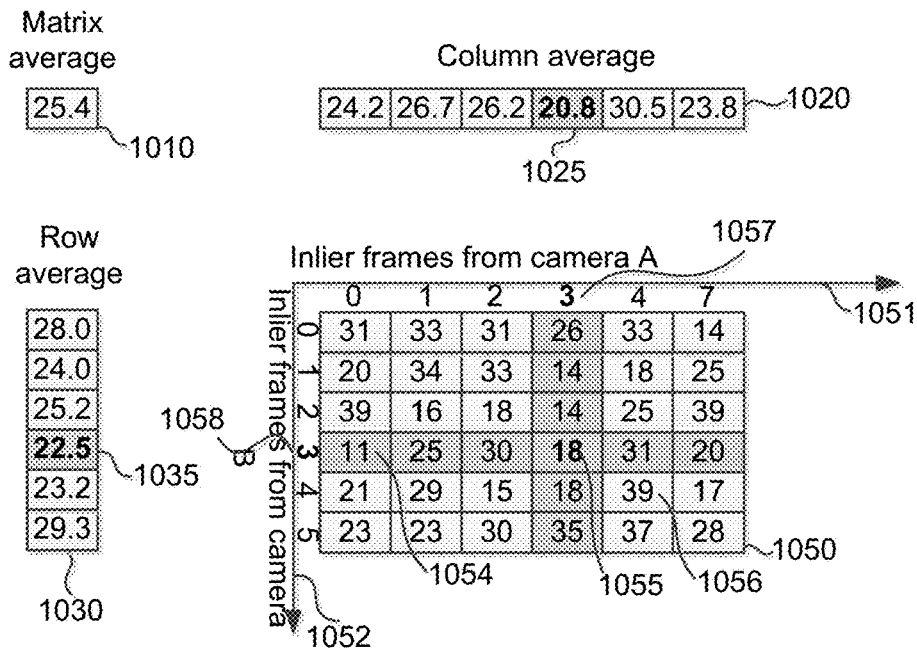
FIG. 10A is a schematic diagram showing an example inter-camera pairwise distance matrix for matching objects across two cameras.

FIG. 10A shows a table 1050 of all pairwise appearance distances between inlier frames 1051 from camera A and inlier frames 1052 from camera B of a matching object. The 6 inliers frames from camera A: 0, 1, 2, 3, 4, 7, are listed along the horizontal axis of table 1050, of which frame 3 is the representative frame 1057. Camera B also has 6 inlier frames: 0, 1, 2, 3, 4, 5, organised along the vertical axis of table 1050, of which frame 3 is the representative frame 1058. In this first example, an object appearance distance is computed for every pair of inlier frames from camera A and camera B. The object appearance distances fill the whole table 1050. Table entries corresponding to at least one representative frame are shaded. The distance 1055 between two representative frames from camera A and camera B has a value of 18. Note that this representative appearance distance is not necessarily the smallest, nor is it the largest distance in the table. The smallest distance of 11 is found in cell 1054 between frame 0 of camera A and the representative frame 3 of camera B. The largest distance of 39 is found in cell 1056 between two non-representative frames of camera A and camera B. However, the representative distance (i.e., 18) is smaller than the average distance (i.e., 25.4) of the whole table. For a matching object, a smaller appearance distance means a better matching score.

Although the appearance distance between two representative frames from camera A and B is not necessarily the smallest distance in table 1050, distances between representative frames tend to be smaller on average than distances between two non-representative frames. The column average array 1020 and row average array 1030 illustrate this point. Matching representative frame 3 from camera A to inlier frames from camera B results in an average appearance distance 1025 of 20.8, which is smaller than other entries in the array 1020. Similarly, matching representative frame 3 from camera B to inlier frames from camera A results in an average appearance distance 1035 of 22.5, which is smaller than other entries in the array 1030.

On average, the inter-camera appearance distances between a matching object from camera A and camera B in FIG. 10A is higher than the intra-camera inlier appearance distances between the same object from camera A in FIG. 9 (25.4>7.3). The inter-camera distance is higher than intra-camera distance for the same object because of significant changes in object appearance across cameras. However, the inter-camera appearance distances between matching object in FIG. 10A is still smaller than the inter-camera appearance distances between non-matching objects in FIG. 10B (25.4<84.3). This is expected because different objects tend to have larger appearance distances than same objects.

Figure 10B:
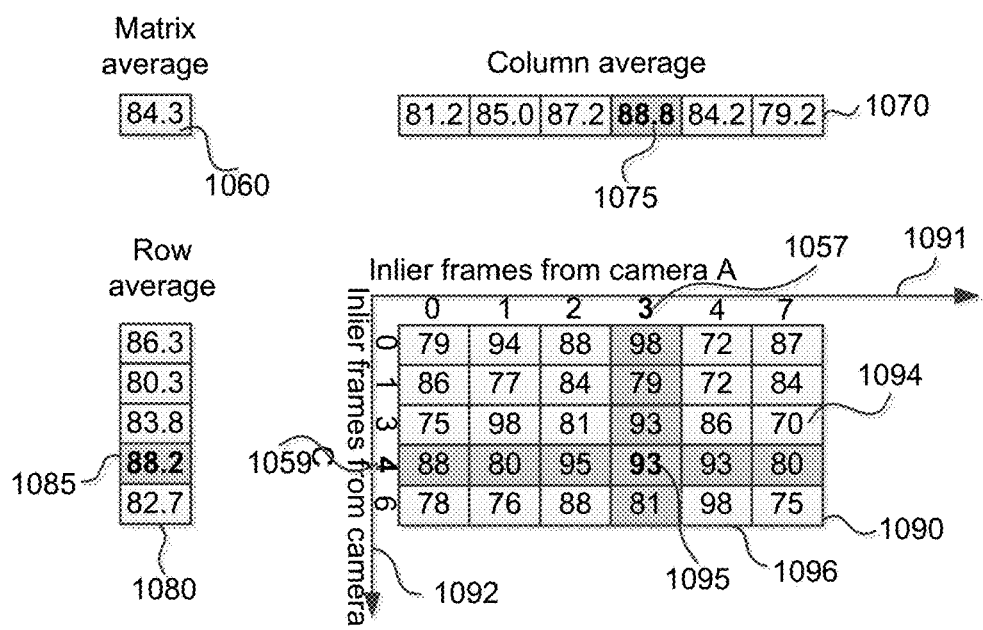
FIG. 10B is a schematic diagram showing an example inter-camera pairwise distance matrix for non-matching objects across two cameras.

FIG. 10B shows a table 1090 of all pairwise appearance distances between inlier frames 1091 from camera A and inlier frames 1092 from camera C for non-matching objects. The 6 inliers frames from camera A: 0, 1, 2, 3, 4, 7, are listed along the horizontal axis of table 1091, of which frame 3 is the representative frame 1057. Camera C has 5 inlier frames: 0, 1, 2, 4, 6, organised along the vertical axis of table 1090, of which frame 4 is the representative frame 1059. In this second example, an object appearance distance is computed for every pair of inlier frames from camera A and camera C. The object appearance distances fill the whole table 1090. Table entries corresponding to at least one representative frames are shaded. The distance 1095 between two representative frames from camera A and camera C has a value of 93. Note that this representative appearance distance is not necessarily the smallest, nor is it the largest distance in the table. The smallest distance of 70 is found in cell 1094 between frame 7 of camera A and frame 3 of camera C. The largest distance of 98 is found in cell 1057 between two non-representative frames of camera A and camera C. However, the representative distance (i.e., 93) is greater than the average distance (i.e., 84.3) of the whole table. For non-matching objects, a higher appearance distance means that the objects do not match or that the candidate object is not the query object.

Although the appearance distance between two representative frames from camera A and C is not necessarily the largest distance in table 1090, distances involving a representative frame tends to be larger on average than distances between two non-representative frames. The column average array 1070 and row average array 1080 illustrate this point. Matching representative frame 3 from camera A to inlier frames from camera C results in an average appearance distance 1075 of 88.8, which is larger than other entries in the array 1070. Similarly, matching representative frame 3 from camera C to inlier frames from camera A results in an average appearance distance 1085 of 88.2, which is larger than other entries in the array 1080. This confirms that using representative frames for image matching is generally more discriminative than using random frames for matching.

Using the representative frame appearance distance 1055 in FIG. 10A for matching objects and the representative frame appearance distance 1095 in FIG. 10B for non-matching objects, a threshold can be chosen, for example at a value of 50, to determine whether two objects under comparison are the same or not. An appearance distance below 50 signifies a match, and the object under comparison can be re-identified across cameras. An appearance distance above 50 signifies a mismatch, and the candidate object under comparison is not re-identified as the query object under comparison.

Figure 11:
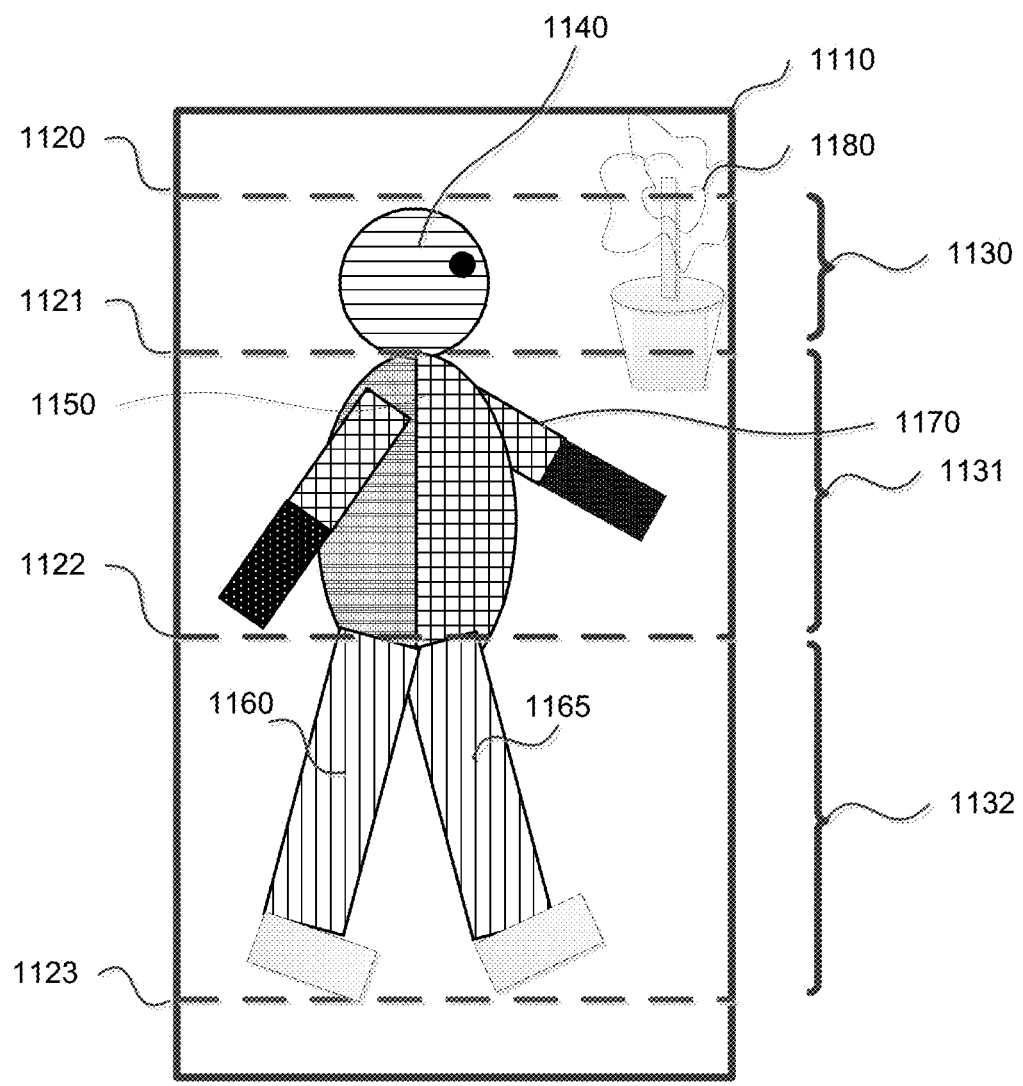
FIG. 11 is a schematic diagram showing an image of a full human body object.

The method 300 of appearance-based re-identification using representative frames is not restricted to headshots of human objects. Instead, the method 300 may be utilized to re-identify inanimate or non-human objects such as bags, guns, bombs, or animals without departing from the scope of the present disclosure. Furthermore, the method may utilize representative frames of a whole human body as shown in FIG. 11 and not just headshots to re-identify a human object.

Referring back to FIG. 11, the input image frame 1110 is a tight crop over a pedestrian 108, although some background objects like 1180 are still present. The object 108 can be divided into three body parts: 1) head 1140, 2) torso 1150 and 3) legs 1160 and 1165, each part typically has a different colour and texture appearance. The body parts can be found by a deformable part model detector, or the parts can be detected using foreground extraction followed by region segmentation. The foreground person can be detected by background subtraction or by other automatic human foreground detectors. After the foreground is segmented, the full body can be partitioned into head region 1130, torso region 1131, and leg region 1132 by horizontal dividing lines 1120, 1121, 1122, 1123. An object appearance can be modelled as a collection of appearance models of its 3 parts: head, torso, and legs. Thereafter, the appearance distance between two objects 108 can be computed as a combination of the appearance distances of the 3 parts: head, torso, and legs.

The arrangements described herein may be utilized in the computer and data processing industries and particularly in the image processing industry.

The foregoing describes only some embodiments of the present disclosure, and modifications and/or changes can be made thereto without departing from the scope and spirit of the disclosure, the embodiments being illustrative and not restrictive.

The invention claimed is:

1. A method for re-identifying a query object moving from a first camera view to a second camera view using an apparatus or system having at least one processor, a first camera and a second camera, the method comprising the steps of:

capturing, via the first camera, a first set of image frames from the first camera view and determining, via the first camera, a plurality of intra-camera object appearance distances between frame pairs in the first set of image frames;

capturing, via the second camera, a second set of image frames from the second camera view and determining, via the second camera, a plurality of intra-camera object appearance distances between frame pairs in the second set of image frames;

accessing, via the at least one processor, the first set of image frames captured from the first camera view of the first camera and the second set of image frames captured from the second camera view of the second camera, the first set of image frames including an instance of the query object and the second set of image frames including an instance of a candidate object;

selecting, via the at least one processor, a first representative frame from the first set of image frames based on the plurality of intra-camera object appearance distances between frame pairs in the first set of image frames and a second representative frame from the second set of image frames based on the plurality of intra-camera object appearance distances between frame pairs in the second set of image frames; and re-identifying, via the at least one processor, the candidate object in the second camera view as the query object in the first camera view based on at least one inter-camera object appearance distance calculated between the first representative frame and the second representative frame.

2. The method according to claim 1, wherein the frames in each set of image frames are partitioned into an inlier cluster and an outlier cluster, and where object appearance distances between frame pairs in the inlier cluster are lower than a cluster formation threshold, object appearance distances between frame pairs from different inlier cluster are higher than the cluster formation threshold, and object appearance distances between a frame from an inlier cluster and a frame from the outlier cluster are higher than an outlier detection threshold.

3. The method according to claim 2, wherein at most one representative frame is selected from each inlier cluster, the representative frame has the smallest average object appearance distance against all other frames in the same inlier cluster.

4. The method according to claim 1, further comprising partitioning frames in each set of image frames into an inlier cluster and an outlier cluster, and excluding frames from the outlier cluster from the selection of the representative frame.

5. The method according to claim 1, wherein each frame includes an image of an object and the method further comprises segmenting the object into parts before computing the object appearance distances.

6. The method according to claim 5, further comprising segmenting each frame into a number of superpixels, each superpixel being labelled as belonging to a part of the object or as the background.

7. The method according to claim 5, further comprising computing the object appearance distance between a frame pair based on part-based object appearance distances between the corresponding parts of the objects.

8. The method according to claim 1, wherein each frame includes at least one of a headshot with two object parts: head and shoulder, or a full human body with three object parts: head, torso and legs.

9. The method according to claim 1, further comprising one or more of:
    storing the first set of image frames from the first camera view, the first set including the instance of the query object, together as a query set in the memory;
    receiving the query set from the memory;
    storing the second set of image frames from the second camera view, the second set including the instance of the candidate object, together in the memory; and
    receiving the candidate set from the memory.

10. The method according to claim 1, wherein one or more of:
    (i) each frame refers to a portion of a video image captured by the first or the second camera where boundaries of the video image portion define a tight crop around the respective object;
    (ii) a tight crop frame is a frame in which the respective object occupies more than 30% of the frame;
    (iii) the query object occupies 30% or more of at least one tight crop frame of the first set; and
    (iv) the candidate object occupies 30% or more of at least one tight crop frame of the second set.

11. A system for re-identifying a query object moving from a first camera view to a second camera view, the system comprising:
    a first camera that operates to capture a first set of image frames from the first camera view and to determine a plurality of intra-camera object appearance distances between frame pairs in the first set of image frames;
    a second camera that operates to capture a second set of image frames from the second camera view and to determine a plurality of intra-camera object appearance distances between frame pairs in the second set of image frames;
    a memory for storing data and a computer program; and
    one or more processors coupled to the memory for executing the computer program, the one or more processors operating to:
    access the first set of image frames captured from the first camera view of the first camera and the second set of image frames captured from the second camera view of the second camera, the first set of image frames including an instance of the query object and the second set of image frames including an instance of a candidate object;
    select a first representative frame from the first set of image frames based on the plurality of intra-camera object appearance distances between frame pairs in the first set of image frames and a second representative frame from the second set of image frames based on the plurality of intra-camera object appearance distances between frame pairs in the second set of image frames; and
    re-identify the candidate object in the second camera view as the query object in the first camera view based on at least one inter-camera object appearance distance calculated between the first representative frame and the second representative frame.

12. The system according to claim 11, wherein the one or more processors further operate to:
    partition the frames in each set of image frames into an inlier cluster and an outlier cluster, and where
    object appearance distances between frame pairs in the inlier cluster are lower than a cluster formation threshold,
    object appearance distances between frame pairs from different inlier cluster are higher than the cluster formation threshold, and
    object appearance distances between a frame from an inlier cluster and a frame from the outlier cluster are higher than an outlier detection threshold; and
    select at most one representative frame from each inlier cluster, the representative frame having the smallest average object appearance distance against all other frames in the same inlier cluster.

13. The system according to claim 11, wherein the one or more processors further operate to partition the frames in each set of image frames into an inlier cluster and an outlier cluster, and exclude frames from the outlier cluster from the selection of the representative frame.

14. The system according to claim 11, wherein each frame includes an image of an object and a background and the one or more processors further operate to:
    segment the object into parts;
    segment each frame into a number of superpixels, each superpixel being labelled as belonging to a part of the object or the background; and
    compute the object appearance distance between a frame pair based on part-based object appearance distances between the corresponding parts of the objects.

15. The system according to claim 11, wherein each frame includes at least one of a headshot with two object parts: head and shoulder, or a full human body with three object parts: head, torso and legs.

16. The system according to claim 11, wherein one or more of:
    the one or more processors comprise a first processor and a second processor, where the first processor is included in or on the first camera and the second processor is included in or on the second camera; and
    the one or more processors comprise at least a first processor, a second processor, and a third processor, where the first processor is included in or on the first camera, the second processor is included in or one the second camera and the third processor is included in or on an additional device that is spaced away from each of the first camera and the second camera.

17. An apparatus for re-identifying a query object moving from a first camera view to a second camera view, the apparatus comprising:
    means for capturing a first set of image frames from the first camera view and for determining a plurality of intra-camera object appearance distances between frame pairs in the first set of image frames;
    means for capturing a second set of image frames from the second camera view and for determining a plurality of intra-camera object appearance distances between frame pairs in the second set of image frames;

means for accessing a first set of image frames captured from the first camera view and a second set of image frames captured from the second camera view, the first set of image frames including an instance of the query object and the second set of image frames including an instance of a candidate object;

means for selecting a first representative frame from the first set of image frames based on the plurality of intra-camera object appearance distances between frame pairs in the first set of image frames and a second representative frame from the second set of image frames based on the plurality of intra-camera object appearance distances between frame pairs in the second set of image frames; and means for re-identifying the candidate object in the second camera view as the query object in the first camera view based on at least one inter-camera object appearance distance calculated between the first representative frame and the second representative frame.

18. The apparatus according to claim 17, comprising means for:

partitioning the frames in each set of image frames into an inlier cluster and an outlier cluster, where object appearance distances between frame pairs in the inlier cluster are lower than a cluster formation threshold, object appearance distances between frame pairs from different inlier cluster are higher than the cluster formation threshold, and object appearance distances between a frame from an inlier cluster and a frame from the outlier cluster are higher than an outlier detection threshold; and selecting at most one representative frame from each inlier cluster, the representative frame having the smallest average object appearance distance against all other frames in the same inlier cluster.

19. The apparatus according to claim 17, comprising means for partitioning the frames in each set of image frames into an inlier cluster and an outlier cluster, and excluding frames from the outlier cluster from the selection of the representative frame.

20. The apparatus according to claim 17, wherein each frame includes an image of an object and a background and the apparatus comprises means for:

segmenting the object into parts;

segmenting each frame into a number of superpixels, each superpixel being labelled as belonging to a part of the object or the background; and computing the object appearance distance between a frame pair based on part-based object appearance distances between the corresponding parts of the objects.

21. The apparatus according to claim 17, wherein each frame includes at least one of a headshot with two object parts: head and shoulder, or a full human body with three object parts: head, torso and legs.

22. A non-transitory computer readable medium having stored thereon a computer program for causing a computer to execute a method for re-identifying a query object moving from a first camera view to a second camera view, the method comprising:

capturing, via a first camera, a first set of image frames from the first camera view and determining, via the first camera, a plurality of intra-camera object appearance distances between frame pairs in the first set of image frames;

capturing, via a second camera, a second set of image frames from the second camera view and determining, via the second camera, a plurality of intra-camera object appearance distances between frame pairs in the second set of image frames;

accessing a first set of image frames captured from the first camera view of the first camera and a second set of image frames captured from the second camera view of the second camera, the first set of image frames including an instance of the query object and the second set of image frames including an instance of a candidate object;

selecting a first representative frame from the first set of image frames based on the plurality of intra-camera object appearance distances between frame pairs in the first set of image frames and a second representative frame from the second set of image frames based on the plurality of intra-camera object appearance distances between frame pairs in the second set of image frames; and re-identifying the candidate object in the second camera view as the query object in the first camera view based on at least one inter-camera object appearance distance calculated between the first representative frame and the second representative frame.

* * * * *